US010186958B2

(12) United States Patent
Roth et al.

(10) Patent No.: US 10,186,958 B2
(45) Date of Patent: Jan. 22, 2019

(54) INPUT-OUTPUT CIRCUITS (71) Applicant: TAIWAN SEMICONDUCTOR MANUFACTURING COMPANY, LTD., Hsinchu (TW)

(72) Inventors: Alan Roth, Leander, TX (US); Chia-Chun Chang, Zhongli (TW); Eric Soenen, Austin, TX (US)

(73) Assignee: TAIWAN SEMICONDUCTOR MANUFACTURING COMPANY, LTD., Hsinchu (TW)

( * ) Notice: Subject to any disclaimer, the term of this patent is extended or adjusted under 35 U.S.C. 154(b) by 0 days.

(21) Appl. No.: 15/709,736

(22) Filed: Sep. 20, 2017

(65) Prior Publication Data
US 2018/0013343 A1 Jan. 11, 2018

Related U.S. Application Data (62) Division of application No. 14/921,192, filed on Oct. 23, 2015, now Pat. No. 9,780,647.

(60) Provisional application No. 62/084,737, filed on Nov. 26, 2014.

(51) Int. Cl.
H02M 3/155 (2006.01)
(52) U.S. Cl.
CPC .................................. H02M 3/155 (2013.01)
(58) Field of Classification Search
USPC ...................................................... 326/80, 81
See application file for complete search history.

(56) References Cited

U.S. PATENT DOCUMENTS

| 5,793,592 | A | 8/1998 | Adams et al. |
| 5,867,010 | A | 2/1999 | Hinedi et al. |
| 5,969,542 | A * | 10/1999 | Maley .................... H03K 3/012 326/17 |
| 6,049,445 | A | 4/2000 | Gauthier, Jr. et al. |
| 6,326,811 | B1 * | 12/2001 | Coddington ..... H03K 19/00315 326/83 |
| 6,346,829 | B1 * | 2/2002 | Coddington ....... H03K 19/0027 326/68 |
| 6,388,495 | B1 * | 5/2002 | Roy .................... G06F 13/4086 326/30 |
| 6,642,769 | B1 * | 11/2003 | Chang .............. H03K 3/356113 326/68 |
| 6,781,415 | B2 | 8/2004 | Clark et al. |
| 6,801,064 | B1 * | 10/2004 | Hunt .................. H03K 19/0013 326/63 |

(Continued)

Primary Examiner — Jeffery S Zweizig
(74) Attorney, Agent, or Firm — Hauptman Ham, LLP (57) ABSTRACT A circuit includes a first circuit that operates at a first-circuit supply voltage value and generates at least one of a first reference voltage value or a second reference voltage value, based on a voltage rated for transistors in a second circuit. The second circuit operates at the first-circuit supply voltage value and receives a first signal and at least one of the first reference voltage value or the second reference voltage value. The first signal is configured to swing between a low voltage value and a high voltage value lower than the first-circuit supply voltage value. The second circuit keeps a voltage across two terminals of a first transistor in the second circuit below the voltage rated for the first transistor, based on the at least one of the first reference voltage value or the second voltage value.

20 Claims, 8 Drawing Sheets (56) References Cited

U.S. PATENT DOCUMENTS

| | | | |
|---|---|---|---|
| 7,199,613 B2 * | 4/2007 | Chauhan | H03K 17/102 326/68 |
| 7,215,146 B2 * | 5/2007 | Khan | H03K 3/356113 326/68 |
| 7,227,400 B1 * | 6/2007 | Gillespie | H03K 19/00315 327/333 |
| 7,382,158 B2 * | 6/2008 | Kimura | H03K 19/01852 326/68 |
| 7,430,100 B2 | 9/2008 | Battacharya et al. | |
| 7,504,861 B2 | 3/2009 | Chuang et al. | |
| 7,706,114 B2 | 4/2010 | Huang et al. | |
| 7,737,734 B1 * | 6/2010 | Khamesra | H03K 19/00361 326/83 |
| 8,405,442 B2 | 3/2013 | Chen | |
| 8,436,671 B2 | 5/2013 | Chern et al. | |
| 8,610,488 B2 | 12/2013 | Yu et al. | |
| 8,625,240 B2 | 1/2014 | Chung et al. | |
| 8,847,659 B1 | 9/2014 | Lan et al. | |
| 2014/0266386 A1 | 9/2014 | Huang et al. | |

\* cited by examiner

FIG. 6

INPUT-OUTPUT CIRCUITS

PRIORITY CLAIM

The present application is a divisional of U.S. application Ser. No. 14/921,192, filed Oct. 23, 2015, which claims the priority of U.S. Provisional Application No. 62/084,737, filed Nov. 26, 2014, which are incorporated herein by reference in their entireties.

BACKGROUND

An integrated circuit commonly includes a core portion and an input-output (I/O) portion. The I/O portion functions for circuits in the core portion to interface with circuits outside of the integrated circuit. Core transistors in the core portion operate at a voltage lower than that of I/O transistors in the I/O portion. As newer technology nodes are introduced approximately every 18 to 36 months, the maximum safe operating voltage of core transistors is lowered. However, between different technology nodes, operating voltages for I/O transistors change less often than the maximum safe operating voltage of core transistors. In various approaches, multiple gate oxides are used for I/O transistors to meet I/O specifications for newer technology nodes. In other approaches, special transistors are used to overcome the discrepancy between I/O voltages and safe operating voltages for core transistors. These special transistors commonly have a higher safe operating range to meet the I/O specifications. Drain extended Metal-Oxide Semiconductor (MOS), Complementary MOS (CMOS) and Double Diffused MOS (DMOS), Bipolar CMOS-DMOS (BCDs) transistors are examples of special transistors. With the advent of Fin Field-Effect-Transistors (FinFETs), special transistors may not meet the I/O requirements.

BRIEF DESCRIPTION OF THE DRAWINGS

The details of one or more embodiments of the disclosure are set forth in the accompanying drawings and the description below. Other features and advantages will be apparent from the description, drawings, and claims.

Like reference symbols in the various drawings indicate like elements.

DETAILED DESCRIPTION

The following disclosure provides many different embodiments, or examples, for implementing different features of the provided subject matter. Specific examples of components and arrangements are described below to simplify the present disclosure. These are merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed. Embodiments and/or examples illustrated in the drawings are disclosed below using specific language. Any alterations and modifications in the disclosed embodiments, and any further applications of the principles disclosed in this document are contemplated as would normally occur to one of ordinary skill in the pertinent art.

Some embodiments of the present disclosure have one or a combination of the following features and/or advantages. Circuits in various embodiments use lower voltage transistors to interface with higher I/O voltage signals without violating reliability limits of low(er) voltage transistors. Compared with other approaches, in some embodiments, I/O buffers and bias circuitry do not use an external power supply or voltage reference to ensure safe operations when using transistors rated at a lower voltage than the I/O voltage. Further, unlike some other approaches, in some embodiments, power sequencing of supply rails is not used. Additionally, the circuits in some embodiments provide relatively low power quiescent (DC) power, thus meeting the demands of I/O specifications.

Input-Output Circuits

In some embodiments, core transistors in a core portion of an integrated circuit use an operating voltage VCORE lower than voltage VIO rated for I/O transistors in an I/O portion of the same integrated circuit. For example, voltage VCORE is about 0.7V to 0.9V, while voltage VIO is about 1.8V. Further, the high voltage value of various signals uses voltage VDDPST that is higher than both voltages VCORE and VIO. Examples values of voltage VDDPST include 2.5V, 3.3V, 5.0V, etc.

In some embodiments, because I/O transistors are rated and operate at 1.8V, I/O transistors are called 1.8V transistors. For 1.8V transistors to safely perform their corresponding functions, a voltage dropped between any two terminals of the transistor should be lower than 1.8V. Otherwise, the transistor is subject to being damaged. Particular values of voltages VDDPST, VCORE, VIO used in this disclosure are for illustration. Different values of each of the voltages are within the contemplated scope of the present disclosure.

Figure 1:
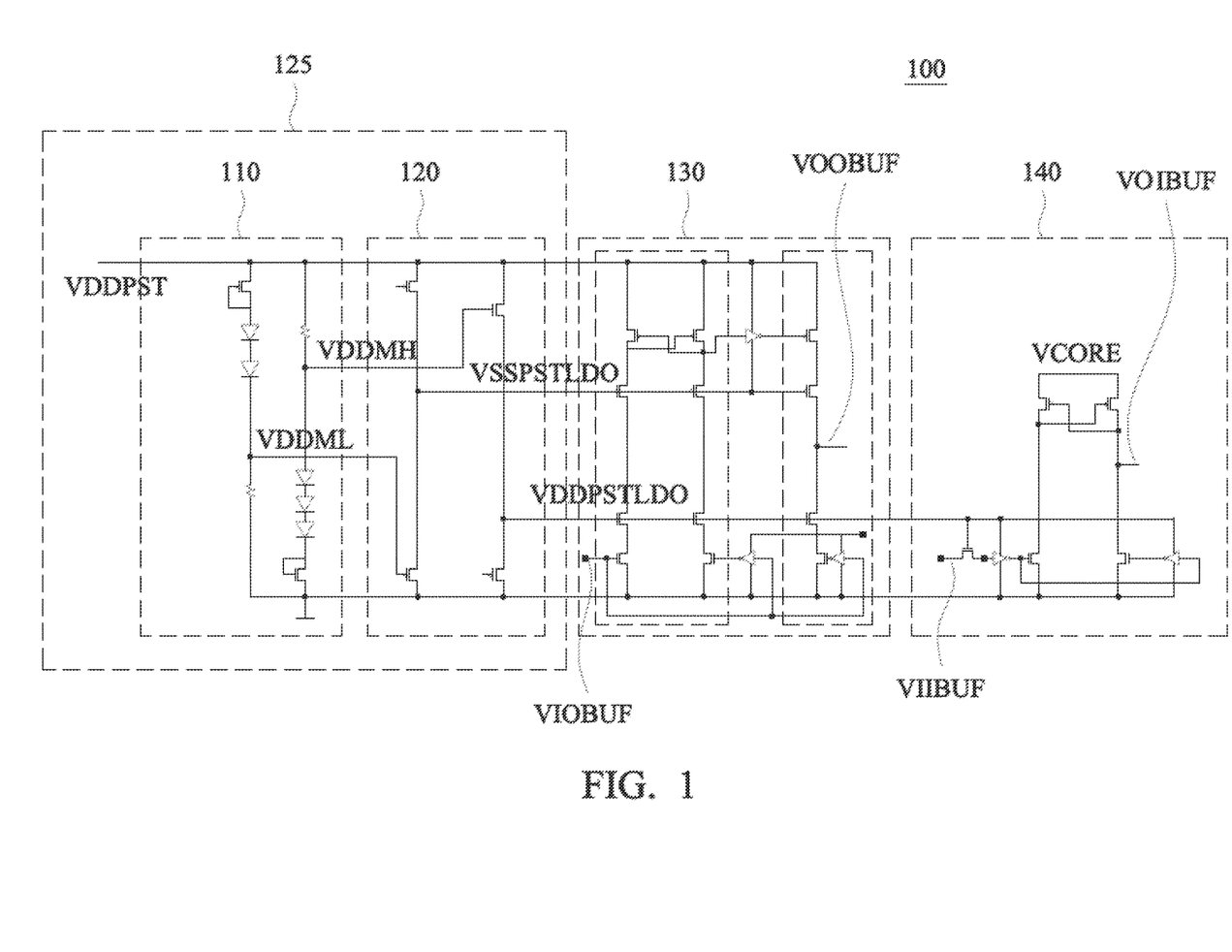
FIG. 1 is a circuit diagram of an input-output circuit in accordance with some embodiments.

FIG. 1 is a diagram of a circuit 100, in accordance with some embodiments. Circuit 100 includes a reference voltage generating circuit 125, and an output buffer 130 and an input buffer 140 coupled with reference voltage generating circuit 125. Depending on configurations as explained below, circuit 100 may be configured as an input circuit or an output circuit. As a result, circuit 100 may be called an input-output circuit 100.

Reference voltage generating circuit 125 includes bias circuit 110 and source follower circuit 120, and generates voltages VDDPSTLDO and VSSPSTLDO. Other ways to generate voltages VDDPSTLDO and/or VSSPSTLDO are within the contemplated scope of the present disclosure.

Bias circuit 110 is operated by supply voltage VDDPST, and provides voltages VDDMH and VDDML to source follower circuit 120. For illustration, unless otherwise stated, voltage VDDPST is 3.3V. Voltages VDDMH and VDDML are each called an intermediate voltage because voltages VDDMH and VDDML are used in an intermediate stage to generate voltages VDDPSTLDO and VSSPSTLDO.

Source follower circuit 120 is operated by voltage VDDPST, and, based on voltages VDDMH and VDDML, provides voltages VDDPSTLDO and VSSPSTLDO. In some embodiments, voltage VDDPSTLDO is used as a voltage supply for other circuits (not shown), including, for example, low drop-out regulators LDO (LDOs), level shifters, etc. Further, voltage VSSPSTLDO is used as a ground supply for the other circuits.

Output buffer 130 is operated by voltage VDDPST, receives voltages VIOBUF, VDDPSTLDO and VSSPSTLDO, and provides output voltage VOOBUF to other circuits (not shown). In some embodiments, voltage VIOBUF is provided by core logic, and swings between 0V and VCORE, which is 0.9V. In some embodiments voltage VIOBUF swings between 0V and VIO, which is 1.8V. Output voltage VOOBUF swings between 0V and voltage VDDPST, which is 3.3V in some embodiments. Explained in a different way, output buffer 130 level shifts input voltage VIOBUF of 0.9V or 1.8V to output voltage VOBUF of 3.3V.

Input buffer 140 is operated by voltage VCORE, receives input voltage VIIBUF, voltage VDDPSTLDO, and provides voltage VOIBUF. In some embodiments, input voltage VIIBUF swings between 0 to VDDPST while output voltage VOIBUF swings between 0V and voltage VCORE. Explained in a different way, input buffer 140 level shifts input voltage VIIBUF of 3.3V to voltage VOIBUF of 0.9V.

Further explanations of bias circuit 110, source follower circuit 120, output buffer 130, and input buffer 140 will be explained with reference to FIGS. 2A-5.

In some embodiments, reference voltage generating circuit 125 and input buffer 140 function as an input circuit of an integrated circuit, and provide voltage VOIBUF to be used in the core section of the integrated circuit. In contrast, reference voltage generating circuit 125 and output buffer 130 function as an output circuit of the integrated circuit, and provide voltage VOOBUF to other integrated circuits in a given system, such as a cell phone, other computing devices, etc. Further, the voltage levels of different voltages including voltages VCORE, VIO, and VDDPST provided above are for illustrations. Other voltage levels are within the contemplated scope of the present disclosure.

Bias Circuit

Figure 2A:
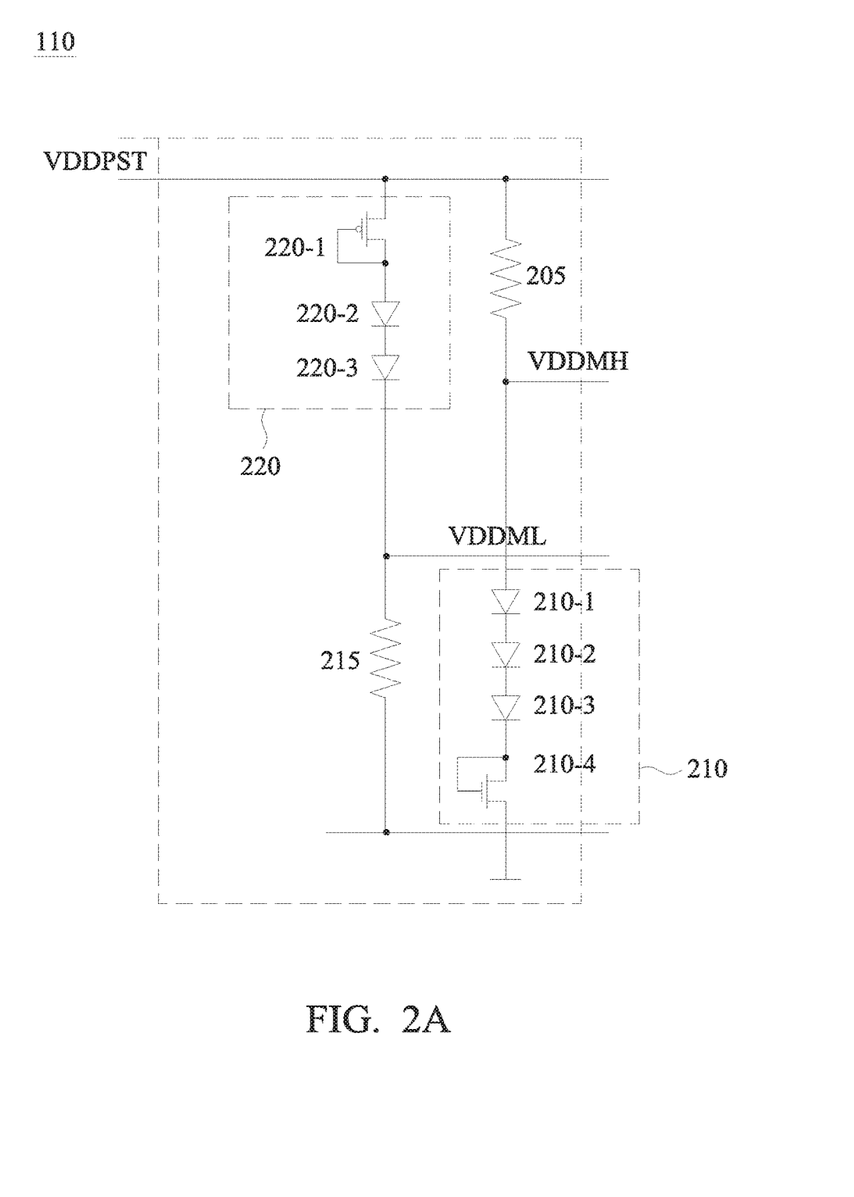
FIG. 2A is a circuit diagram of the bias circuit in FIG. 1, in accordance with some embodiments.
Figure 2B:
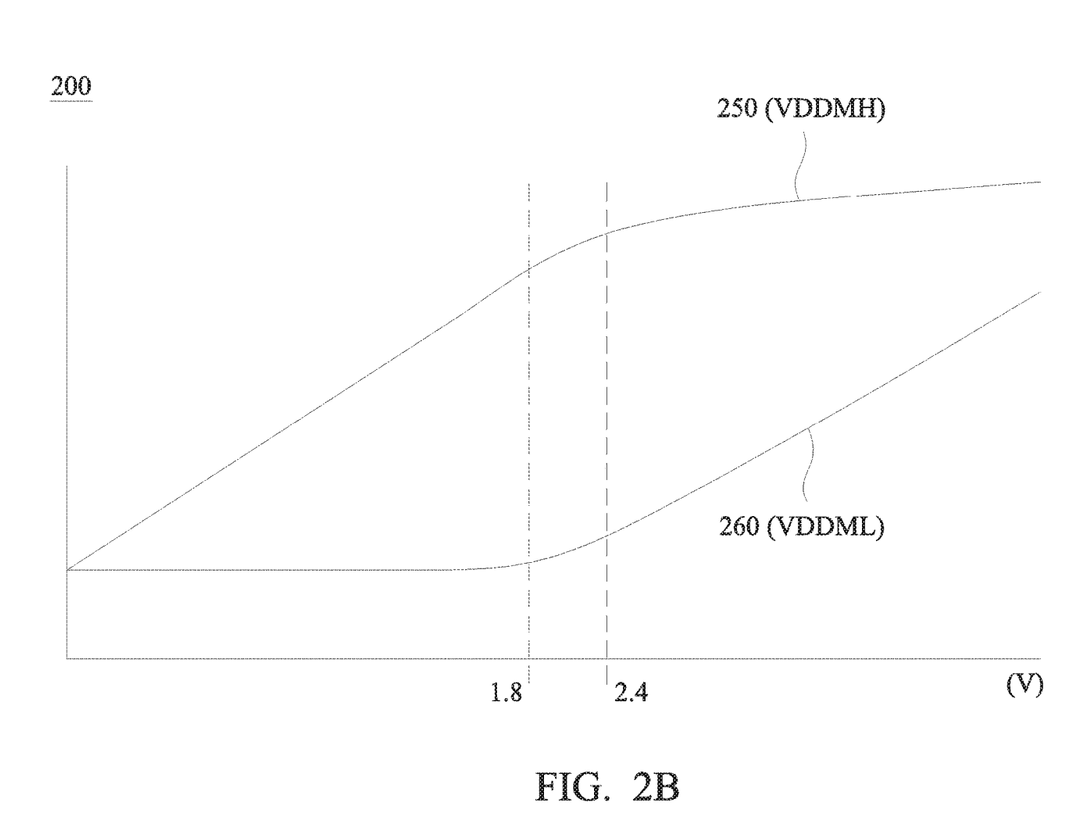
FIG. 2B is a graph of waveforms illustrating behavior of voltages VDDMH and VDDML of the bias circuit in FIG. 2A with reference to voltage VDDPST, in accordance with some embodiments.

FIG. 2A is a circuit diagram of bias circuit 110 of FIG. 1, in accordance with some embodiments. Bias circuit 110 generates voltages VDDMH and VDDML. FIG. 2B is a graph of waveforms 200, in accordance with some embodiments. Waveforms 200 are used to illustrate behaviors of voltages VDDMH and VDDML with reference to voltage VDDPST based on lines 250 and 260, respectively. In FIG. 2B, the X-axis represents voltage VDDPST while the Y-axis represents corresponding voltage VDDMH or voltage VDDML.

With reference to FIG. 2A, bias circuit 110 provides voltage VDDMH, which is clamped at voltage VCLAMP1 (not shown). Voltage VDDMH is used in source follower circuit 120. Voltage VCLAMP1 is selected such that transistors in source follower 120, output buffer 130, and input buffer 140 operate in a safe region. For illustration, transistors in source follower circuit 120, output buffer 130, and input buffer 140 include 1.8V transistors, and voltage VCLAMP1 is selected to clamp VDDMH such that the 1.8V transistors do not receive a voltage that is higher than 1.8V across any two terminals of the same transistors.

In clamp circuit 210, four diodes 210-1, 210-2, 210-3, and 210-4 are coupled in series. For illustration, a voltage VD (not shown) dropped between a diode in circuit 210 is 0.6V. As a result, a voltage dropped across four diodes 210-1, 210-2, 210-3, and 210-4 is 2.4V (=0.6V×4), and serves as voltage VCLAMP1. Diode 210-4 is formed by an NMOS transistor, and is used to compensate for a threshold voltage Vt310 of transistor 310 in FIG. 3, and will be explained with reference to FIG. 3. Resistor 205 provides a current path for voltage VDDMH. Resistor 205 and diodes 210-1, 210-2, 210-3, and 210-4 are configured such that voltage VDDMH follows voltage VDDPST when voltage VDDPST is lower than voltage VCLAMP1, and is clamped at voltage VCLAMP1, when voltage VDDPST is higher than voltage VCLAMP1. In other words, regardless of the values of voltage VDDPST, voltage VDDMH is not higher than voltage VCLAMP1. In some embodiments, voltage VCLAMP1 is selected to be I/O operating voltage VIO plus a diode voltage VD. For example, voltage VCLAMP1 is 2.4V.

In FIG. 2B, with reference to line 250, when voltage VDDMH is less than voltage VCLAMP1, diodes 210-1, 210-2, 210-3, and 210-4 act as an open circuit. As a result, no current flows through resistor 205, and voltage VDDMH is voltage VDDPST. Effectively, voltage VDDMH follows voltage VDDPST when voltage VDDPST is less than voltage VCLAMP1. In contrast, when voltage VDDPST is higher than voltage VCLAMP1, diodes 210-1, 210-2, 210-3, and 210-4 conduct, and a current flows through resistor 205. As a result, voltage VDDMH has a voltage value dropped across diodes 210-1, 210-2, 210-3, and 210-4, which is voltage VCLAMP1. In other words, voltage VDDMH is clamped at voltage VCLAMP1, or 2.4V in some embodiments.

Diode 210-4 is implemented by an NMOS transistor configured as a diode to compensate for variations in manufacturing processes, supply voltages and/or temperatures (PVT). For example, transistors in circuit 110 are susceptible to PVT variations. The NMOS transistor configured as diode 210-4 is subject to the same PVT variations, functions to compensate for those variations, and therefore enables circuit 210 to be more immune to PVT variations than other configurations. Other ways to compensate for PVT variations are within the contemplated scope of the present disclosure.

With reference to clamp circuit 220 in FIG. 2A, three diodes 220-1, 220-2, and 220-3 are coupled in series. In some embodiments, a voltage VD (not shown) dropped between a diode in circuit 220 is 0.6V. As a result, a voltage dropped across diodes 220-1, 220-2, and 220-3 is 1.8V (=0.6V× 3), and serves as a voltage VCLAMP2 (not labeled). Resistor 215 provides a current path for voltage VDDML. Resistor 215 and diodes 220-1, 220-2, and 220-3 are configured such that voltage VDDML is clamped at VDDPST−VCLAMP2 when voltage VDDPST is higher than voltage VCLAMP2. In some embodiments, voltage VCLAMP2 is selected to be I/O operating voltage VIO. Diode 220-1 is implemented by a PMOS transistor configured as a diode to compensate for PVT variations in a manner similar to diode 210-4 implemented by an NMOS transistor compensating PVT variations. Other ways to compensate for PVT variations are within the contemplated scope of the present disclosure.

With reference to line 260 in FIG. 2B, when voltage VDDPST is less than voltage VCLAMP2 or 1.8V in some embodiments, voltage VDDPST does not have sufficient potential to turn on diodes 220-1, 220-2, and 220-3 in clamp circuit 220. Clamp circuit 220 therefore acts as an open circuit. Consequently, voltage VDDML is at voltage VSS of 0V. In contrast, when voltage VDDPST is higher than voltage VCLAMP2, diodes 220-1, 220-2, and 220-3 conduct and provide current to resistor 215. Electrically, voltage VDDML is voltage VDDPST minus voltage VCLAMP2 dropped across clamp circuit 220. In other words, voltage VDDML is clamped at voltage VDDPST−VCLAMP2.

Circuit 210 using diodes 210-1, 210-2, 210-3, and 210-4 to clamp voltage VDDMH is for illustration. Other mechanisms and/or other implementations of circuit 210 used to clamp voltage VDDMH are within the contemplated scope of the present disclosure. For example, when a diode has a different threshold voltage VD, the number of diodes changes accordingly. For example, when the threshold voltage VD for a diode is 0.8V, three, instead of four, diodes are used to result in voltage VCLAMP1 of 2.4V, etc.

Similarly, circuit 220 using diodes 220-1, 220-2, and 220-3 to clamp voltage VDDML is for illustration. Other mechanisms and/or other implementations of circuit 220 used to clamp voltage VDDML are within the contemplated scope of the present disclosure. For example, when a diode has a different threshold voltage VD, the number of diodes changes accordingly. For example, when the threshold voltage VD for a diode is 0.9V, two, instead of three, diodes are used to result in voltage VCLAMP2 of 1.8V, etc.

Source Follower Circuit

Figure 3A:
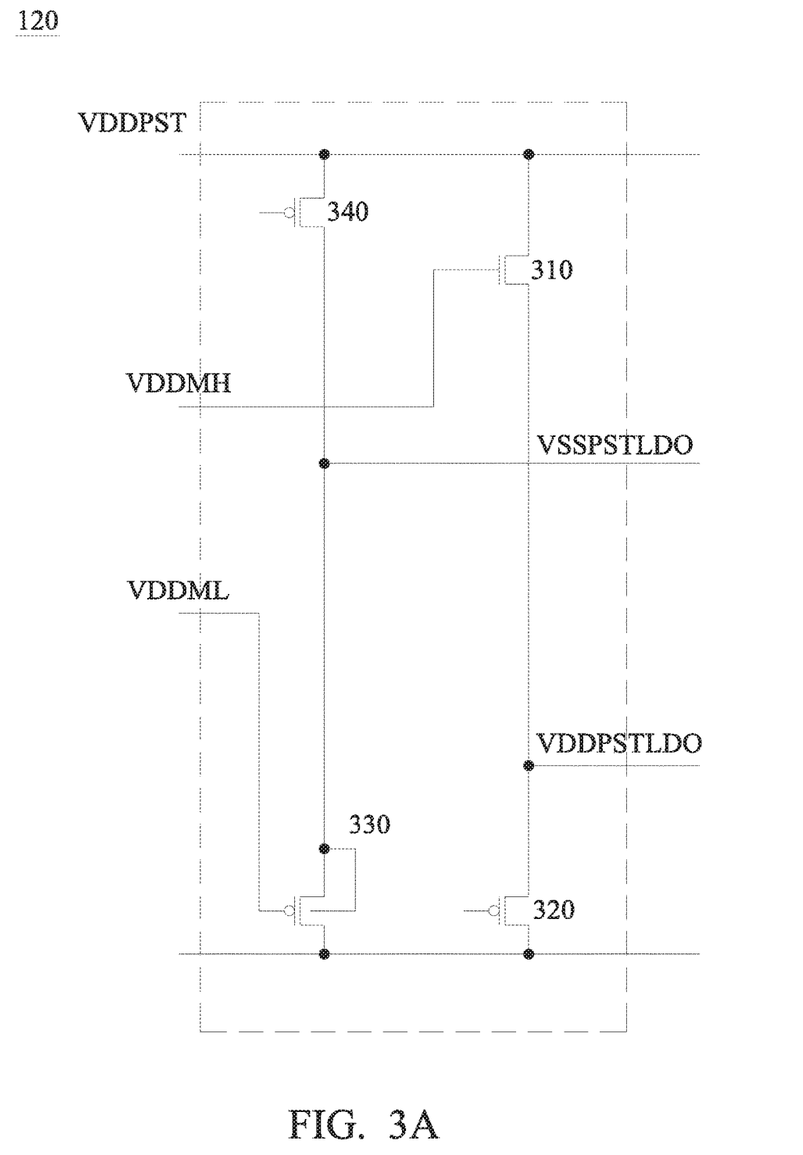
FIG. 3A is a circuit diagram of the source follower circuit in FIG. 1, in accordance with some embodiments.
Figure 3B:
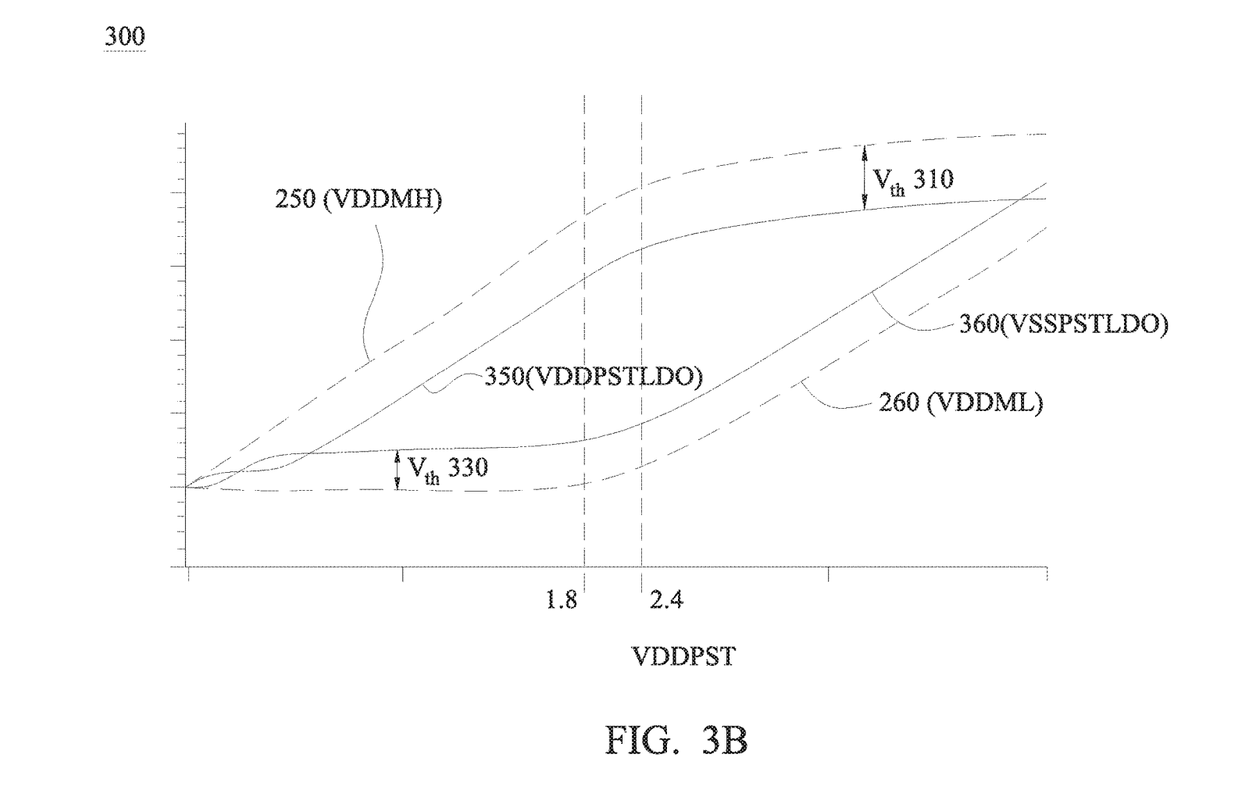
FIG. 3B is a graph of waveforms illustrating behavior of voltages VDDPSTLDO and VSSPSTLDO of the source follower circuit in FIG. 3A with reference to voltage VDDPST, in accordance with some embodiments.

FIG. 3A is a diagram of source follower circuit 120 of FIG. 1, in accordance with some embodiments. Source follower circuit 120 generates voltages VDDPSTLDO and VSSPSTLDO. FIG. 3B is a graph of waveforms 300, in accordance with some embodiments. Waveforms 300 are used to illustrate behaviors of voltages VDDPSTLDO and VSSPSTLDO with reference to voltage VDDPST, as represented by lines 350 and 360, respectively. Waveforms 300B also include waveforms 200 of FIG. 2B that illustrate the behavior of voltages VDDMH and VDDML.

In FIG. 3A, N-channel transistor 310 is configured as an N-channel source follower and provides voltage VDDPSTLDO. Because transistor 310 functions as a source follower, voltage VDDPSTLDO at the source of transistor 310 follows voltage VDDMH at the gate of transistor 310 lowered by a threshold voltage Vth310 (not shown) of transistor 310. Explained in a different way, a voltage level of voltage VDDPSTLDO is clamped to threshold voltage Vth310 below voltage VDDMH. For illustration, threshold voltage Vth210 of transistor 210 in FIG. 2 is the same as threshold voltage Vth310. Because voltage VDDMH is clamped at voltage VIO+Vth210, voltage VDDPSTLDO is clamped at voltage VIO (=VIO+Vth210−Vth310), or 1.8V, in some embodiments. In some embodiments, while source follower 120 is in operation, PMOS transistor 320 is configured to turn on, and, as a result, serves as a current path for transistor 310 and for voltage VDDPSTLDO at the source of transistor 310. As illustrated in FIG. 3B, voltage VDDPSTLDO represented by line 350 is below voltage VDDMH represented by line 250 by threshold voltage Vth310.

P-channel transistor 330 is configured as a P-channel source follower and provides voltage VSSPSTLDO. Because transistor 310 functions as a source follower, voltage VDDPSTLDO at the source of transistor 310 follows voltage VDDML at the gate of transistor 330 raised by a threshold voltage Vth330 (not shown) of transistor 330. Explained in a different way, a voltage level of voltage VSSPSTLDO is clamped to threshold voltage Vth330 above voltage VDDML. Because voltage VDDML is clamped at voltage VSSPST−VCLAMP2, voltage VSSPSTLDO is clamped at voltage VSSPST−VCLAMP2+Vth330. In some embodiments, while source follower 120 is in operation, PMOS transistor 340 is configured to turn on, and, as a result, serves as a current path for transistor 330 and for voltage VSSPSTLDO at the source of transistor 330. As illustrated in FIG. 3B, voltage VSSPSTLDO represented by line 360 is above voltage VDDML represented by line 260 by threshold voltage Vth330.

Output Buffer

Figure 4:
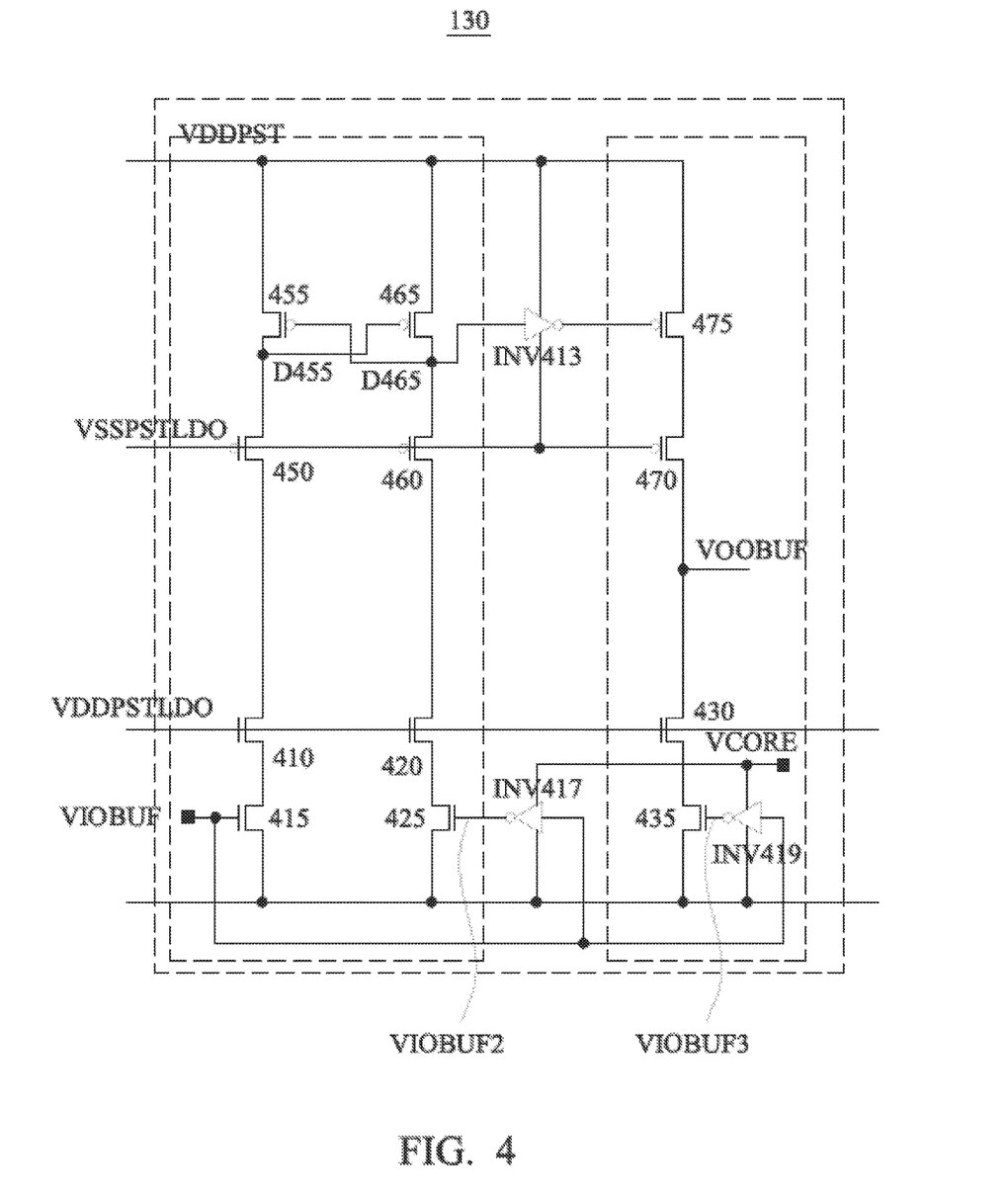
FIG. 4 is a circuit diagram of the output buffer of the circuit in FIG. 1, in accordance with some embodiments.

FIG. 4 is a diagram of output buffer or circuit 130 in FIG. 1, in accordance with some embodiments.

In some embodiments, voltages VDDMH, VDDML, VDDPSTLDO, VSSPSTLDO and related circuit elements are configured such that transistors in circuit 130 operate with a safe operating voltage. For example, transistors 415, 425, 435, 455, 465, 475, 410, 420, 430, 450, 460, and 470 are 1.8V transistors. As a result, voltages VDDMH, VDDML, VDDPSTLDO, and VSSPSTLDO are configured such that a voltage dropped across two terminals of a corresponding transistor is lower than 1.8V. For another example, gates of transistors 410, 420, 430 receive voltage VDDPSTLDO, which is clamped at voltage VIO of 1.8V. As a result, when transistor 415 is off and transistor 455 is on, each of transistors 410, 420, and 430 functions as a source follower. Further, the voltage at the source of transistor 410 is at most VDDPSTLDO−Vth410 in which voltage Vth410 is the threshold voltage of transistor 410. Consequently, the voltage at the drain of transistor 415 coupled with the source of transistor 410 is VDDPSTLDO−Vth410. In some embodiments, voltage VDDPSTLDO is clamped at 1.8V. As a result, VDDPSTLDO−Vth410 at the drain of transistor 415 is less than 1.8V. Because the source of transistor 415 is at VSS of 0V, the voltage dropped across the drain and the source of transistor 415 is less than 1.8V, which keeps transistor 415 operating with safe voltages. In a manner similar to transistor 410 protecting transistor 415, transistor 420 protects transistor 425, and transistor 430 protects transistor 435.

Further, gates of transistors 450, 460, 470 receive voltage VSSPSTLDO, which is clamped at voltage VDDPST−VIO of 1.8V. As a result, when transistor 415 is on and transistor 455 is off, each of transistors 450, 460, and 470 functions as a source follower. Consequently, the voltage at the source of transistor 450 is at most VDDPST−VIO+Vth450 in which voltage Vth450 is the threshold voltage of transistor 450. As a result, the voltage at the drain of transistor 455 coupled with the source of transistor 450 is VDDPST−VIO+Vth450. Because the source of transistor 455 is at VDDPST, the voltage dropped across the source and the drain of transistor 455 is VDDPST−(VDDPST−VIO+Vth450) or VIO−Vth450. In some embodiments, voltage VIO is 1.8V. As a result, VIO−Vth450 is less than 1.8V, which keeps transistor 415 operating in a safe voltage region. In a manner similar to transistor 450 protecting transistor 455, transistor 460 protects transistor 465, and transistor 470 protects transistor 475.

With reference to operations of output buffer 130, in some embodiments, PMOS transistor 455 and NMOS transistor 415 function as an inverter. PMOS transistor 465 and NMOS transistor 425 function as an inverter, and PMOS transistor 475 and NMOS transistor 435 function as an inverter. As a result, when transistor 455 is on, transistor 415 is off and vice versa. When transistor 465 is on, transistor 425 is off and vice versa, and when transistor 475 is on, transistor 435 is off and vice versa.

For illustration, voltage VIOBUF is 0V or logically low. As a result, voltage VIOBUF2 is logically high through inverter INV417, and voltage VIOBUF3 is logically high through inverter INV419. Because voltage VIOBUF is logically low, transistor 415 is off, and transistor 455 is on. Node D455 at the drain of transistor 455 is therefore pulled to VDDPST at the source of transistor 455. Node D455 at the gate of transistor 465 being logically high causes transistor 465 to be off. Transistor 460 then acts as a source follower to provide VSSPSTLDO+Vt460 at node D465. Node D465 at the gate of transistor 455 being at VSSPSTLDO+Vt460 and VDDPST at the source of transistor 455 confirm that transistor 455 is on. Further, node D465 being at VSSPSTLDO+Vt460 is considered a low logical value for inverter INV413 because the reference voltage for inverter INV413 is at VSSPSTLDO. Because node D465 is logically low, the gate of transistor 475 is logically high through inverter INV413, and transistor 475 is turned off.

In contrast, when voltage VIOBUF is logically high, voltage VIOBUF2 is logically low through inverter INV417, and voltage VIOBUF3 is logically low through inverter INV419. Because voltage VIOBUF2 is logically low, transistor 425 is off, and transistor 465 is on. Node D465 at the drain of transistor 465 is therefore pulled to VDDPST at the source of transistor 465. Node D465 at the gate of transistor 455 being logically high causes transistor 455 to be off. Transistor 450 then acts as a source follower to provide VSSPSTLDO+Vt450 at node D455. Node D455 at the gate of transistor 465 being at VSSPSTLDO+Vt460 and VDDPST at the source of transistor 465 confirm that transistor 465 is on. Further, node D465 being at VDDPST is considered a high logical value for inverter INV413 because the reference voltage for inverter INV413 is at VSSPSTLDO. Because node D465 is logically high, the gate of transistor 475 is logically low through inverter INV413, and transistor 475 is turned on. As a result, both node D475 and voltage VOOBUF is at VDDPST at the source of transistor 475.

Inverter INV413 is used to increase the drive strength of signals on node D465 and/or to buffer the drive strength to meet the high input capacitance of transistor 475. For example, in various embodiments, transistor 475 is a relatively large transistor to provide a relatively large current to voltage VOOBUF. Inverter INV413 is added to keep transistors 455 and 465 to be relatively small but still enables voltage VOOBUF to have a relative large current. For another example, without inverter INV413, transistors 455 and 465 would be relatively larger than transistors 455 and 465 with inverter INV413, to provide a large current to transistor 475 and thus to voltage VOOBUF. One inverter INV413 is shown for illustration. A chain of inverters or other circuits in place of inverter INV413 is within the contemplated scope of the present disclosure.

Voltages VDDPSTLDO, VSSPSTLDO, and corresponding transistors 410, 420, 430, 440, 450, 460, and 470 used to protect transistors in circuit 130 having a voltage shifting functions are for illustration. Other functions of circuit 130 are within the contemplated scope of the present disclosure.

Input Buffer

Figure 5:
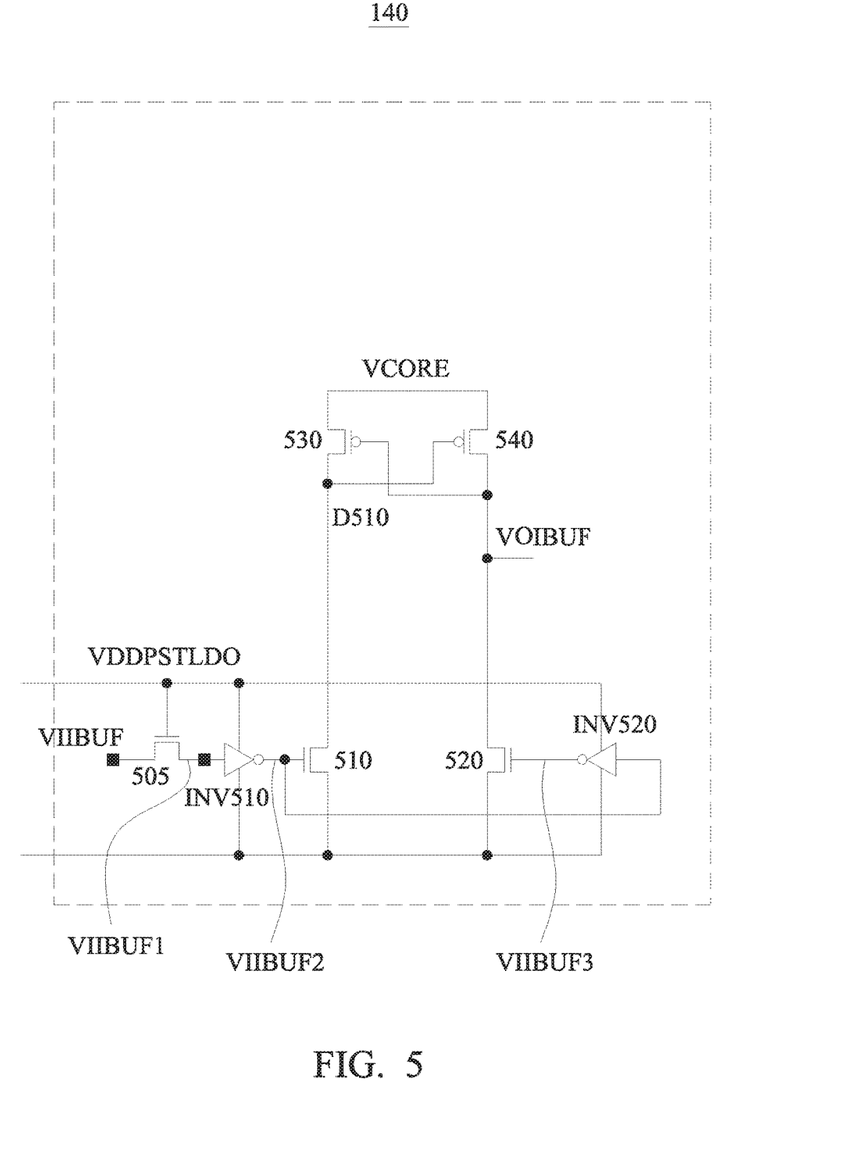
FIG. 5 is a circuit diagram of the input buffer of the circuit in FIG. 1, in accordance with some embodiments.

FIG. 5 is a circuit diagram of input buffer 140 of FIG. 1, in accordance with some embodiments. Inverters INV510 and INV520 use voltage VDDPSTLDO as a supply voltage.

In some embodiments, voltage VIIBUF swings between voltage VSS of 0V and voltage VDDPST. As explained in detail below, circuit 140 receives voltage VIIBUF having a high voltage value of VDDPST and provides voltage VOIBUF having a high voltage value of voltage VCORE. Effectively, circuit 140 receives a higher voltage value VDDPST and provides a lower voltage value VCORE.

NMOS transistor 505 receives voltage VDDPSTLDO at the gate of transistor 505. As a result, node NVIIBUF1 (not shown) having voltage VIIBUF1 is clamped voltage VDDPSTLDO−Vth505 in which voltage Vth505 is the threshold voltage of transistor 505. In some embodiments, voltage VDDPSTLDO is clamped at VIO of 1.8V. As a result, VDDPSTLDO−Vth505 is less than 1.8V. In some embodiments, because transistors 510, 520, and transistors in inverters INV510 and IVN520 are 1.8V transistors, and node NVIIBUF1, being an input node, is clamped below 1.8V, transistors 510, 520, 530, 540, and transistors in inverters INV510 and IVN520 operate in a safe voltage region.

In some embodiments, when voltage VIIBUF is logically high at voltage VDDPST, voltage VIIBUF1 is logically high at voltage VDDPSTLDO. Further, voltage VIIBUF2 is logically low through inverter INV510, and voltage VIIBUF3 is logically high through inverter INV520. Because voltage VIIBUF2 is logically low, transistor 510 is off. Because voltage VIIBUF3 is logically high, transistor 520 is on, which pulls voltage VOIBUF to a low logical value of VSS at the source of transistor 520. Because voltage VOIBUF at the gate of transistor 530 is logically low, transistor 530 is turned on, and pulls node D510 to a high logical value of voltage VCORE at the source of transistor 530. Because node D510 at the gate of transistor 540 is logically high, transistor 540 is turned off, and has no electrical effect on voltage VOIBUF, which is logically low as explained above. Effectively, circuit 140 converts a high logical value of voltage VIIBUF to a low logical value voltage VOIBUF.

In contrast, when voltage VIIBUF is logically low at the voltage value VSS, by operation of NMOS transistor 505, voltage VIIBUF1 is also logically low, voltage VIIBUF2 is logically high, and voltage VIIBUF3 is logically low. Because voltage VIIBUF3 is logically low, transistor 520 is off. Because voltage VIIBUF2 is logically high, transistor 510 is on, which pulls node D510 to a low logical value of VSS at the source of transistor 510. Because node D510 at the gate of transistor 540 is logically low, transistor 540 is turned on, and pulls voltage VOIBUF to voltage VCORE at the source of transistor 530. Because voltage VOIBUF at the gate of transistor 530 is logically high at the voltage value VCORE, transistor 530 is turned off, and has no electrical effect on node D510, which is logically low as explained above. Effectively, circuit 140 converts a low logical value of voltage VIIBUF to a high logical value VCORE of voltage VOIBUF.

Voltages VDDPSTLDO and transistor 505 used to protect transistors in circuit 140 having a voltage shifting functions are for illustration. Other functions of circuit 140 are within the contemplated scope of the present disclosure.

Methods

Figure 6:
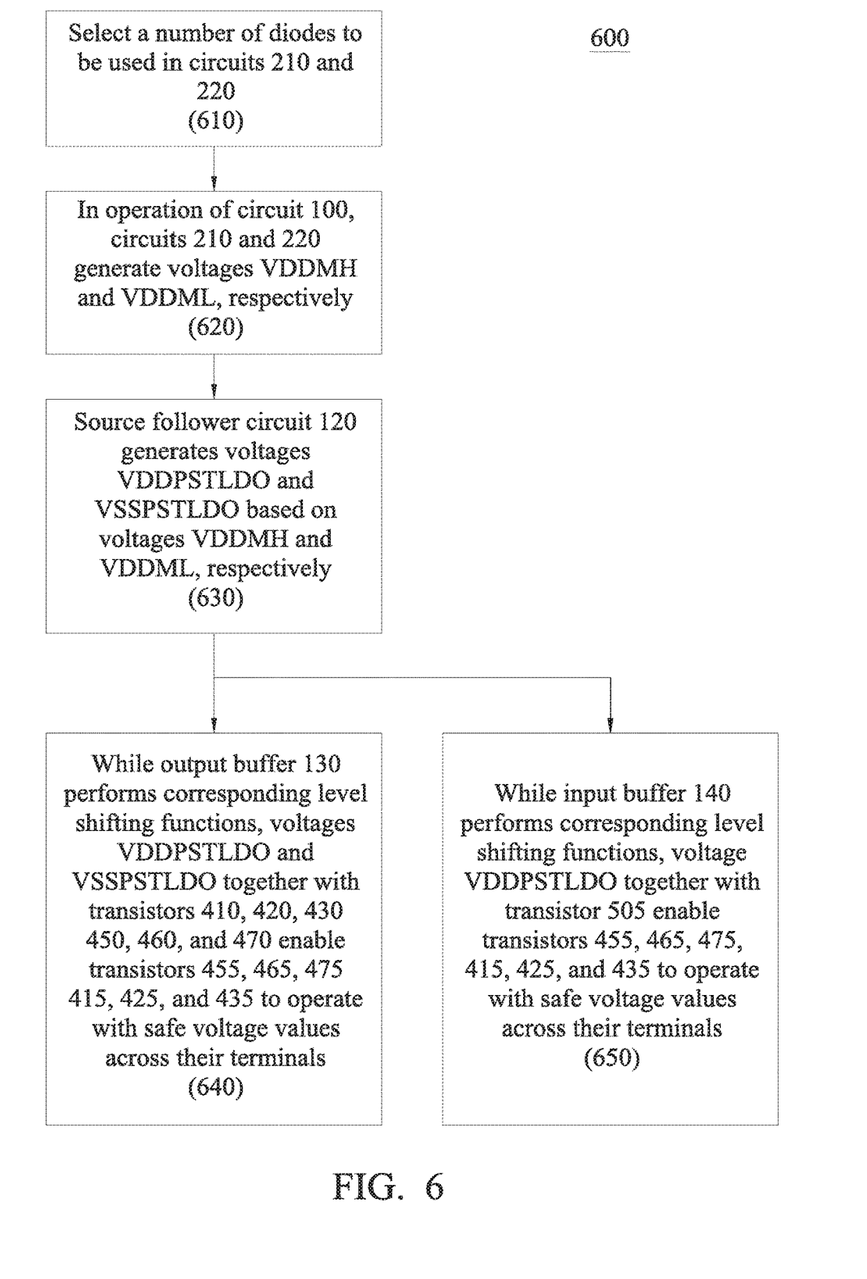
FIG. 6 is a flowchart of a method illustrating operations of the circuit in FIG. 1, in accordance with some embodiments.

FIG. 6 is a flow chart of a method 600, in accordance with some embodiments.

In operation 610, voltage VD dropped across a diode is determined. Based on voltage VIO rated for transistors in output buffer 140 and input buffer 130, a corresponding number of diodes are selected to be used in circuits 210 and 220. Configurations of diodes to compensate for PVT variations are also considered.

In operation 620, when circuit 100 is in operation, circuits 210 and 220 generate voltages VDDMH and VDDML, respectively.

In operation 630, source follower circuit 120, based on voltages VDDMH and VDDML, generates voltages VDDPSTLDO and VSSPSTLDO, respectively.

In operation 640, while output buffer 130 performs corresponding level shifting function, voltages VDDPSTLDO and VSSPSTLDO together with transistors 410, 420, 430, 450, 460, and 470 enable transistors 455, 465, 475, 415, 425, and 435 to operate with safe voltage values. Effectively, voltages VDDPSTLDO and VSSPSTLDO together with transistors 410, 420, 430, 450, 460, and 470 protect transistors 455, 465, 475, 415, 425, and 435. Inverter INV413 can function to buffer the drive strength to meet the high input capacitance of transistor 475.

Alternatively and/or additionally, in operation 650, while circuit 140 performs corresponding level shifting functions, voltage VDDPSTLDO, together with transistor 505 enable transistors 530, 540, 510, and 520 to operate within safe voltage values. Effectively, voltage VDDPSTLDO and transistor 505 protect transistors 530, 540, 510, and 520.

Various embodiments of the present disclosure are advantageous over other approaches. For example, in some other approaches, to keep transistors in circuits 130 and/or 140 operating in a safe region, the other approaches use an external power supply or external references voltages in addition to supply voltages VSS, VCORE, and VDDPST. Alternatively and/or additionally, the other approaches use a sequence to power up voltages VCORE, VDDPST, etc. In contrast, in various embodiments of the present disclosure as disclosed above, none of bias circuit 110, output buffer 140, or input buffer 130 uses an external power supply or external voltage reference in addition to supply voltages VSS, VCORE, and VDDPST. Further, unlike some other approaches, in some embodiments, power sequencing of supply rails is not used. Additionally, the circuits in some embodiments of the present disclosure provide a relatively low current, thus meeting the demands secure digital input output (SDIO) specifications, including, for example, the standby power requirements of SDIO.

In some embodiments, a circuit includes a first circuit configured to operate at a first-circuit supply voltage value and to generate at least one of a first reference voltage value or a second reference voltage value, based on a voltage rated for transistors in a second circuit. The second circuit is configured to operate at the first-circuit supply voltage value, to receive a first signal and at least one of the first reference voltage value or the second reference voltage value. The first signal is configured to swing between a low voltage value and a high voltage value lower than the first-circuit supply voltage value. The second circuit is configured to keep a voltage across two terminals of a first transistor in the second circuit below the voltage rated for the first transistor, based on the at least one of the first reference voltage value or the second voltage value.

In some embodiments, a method of protecting a first P-type transistor and a first N-type transistor includes generating a first reference voltage value based on a first-circuit supply voltage value and an N-type source follower, generating a second reference voltage value based on the first-circuit supply voltage value and a P-type source follower, applying the first reference voltage value to a gate of a second N-type transistor, and applying the second reference voltage value to a gate of a second P-type transistor. A source of the first P-type transistor is configured to receive the first-circuit supply voltage value, a drain of the first P-type transistor is coupled with a source of the second P-type transistor, a drain of the second P-type transistor is coupled with a drain of the second N-type transistor, and a source of the second N-type transistor is coupled with a drain of the first N-type transistor.

In some embodiments, a circuit includes a reference voltage generating circuit including a first source follower configured to generate a first reference voltage value based on a first-circuit supply voltage and a second source follower configured to generate a second reference voltage value based on the first-circuit supply voltage. The circuit includes an output buffer including a first transistor configured to receive the first reference voltage value, a second transistor configured to receive the second reference voltage value, a third transistor configured to receive an input signal having a swing between a low voltage value and a high voltage value lower than a value of the first-circuit supply voltage, and an output node between the first transistor and the second transistor. The output buffer is configured to output an output voltage on the output node, the output voltage being based on the input signal and having a swing between the low voltage value and the first-circuit supply voltage value.

A number of embodiments have been described. It will nevertheless be understood that various modifications may be made without departing from the spirit and scope of the disclosure. For example, various transistors being shown as a particular dopant type (e.g., N-type or P-type Metal Oxide Semiconductor (NMOS or PMOS)) are for illustration purposes. Embodiments of the disclosure are not limited to a particular type. Selecting different dopant types for a particular transistor is within the scope of various embodiments. The low or high logical value of various signals used in the above description is also for illustration. Various embodiments are not limited to a particular logical value when a signal is activated and/or deactivated. Selecting different logical values is within the scope of various embodiments. In various embodiments, a transistor functions as a switch. A switching circuit used in place of a transistor is within the scope of various embodiments. In various embodiments, a source of a transistor can be configured as a drain, and a drain can be configured as a source. Various figures show discrete resistors for illustration. Equivalent circuitry may be used. For example, a resistive device, circuitry or network (e.g., a combination of resistors, resistive devices, circuitry, etc.) can be used in place of the resistor. The above illustrations include exemplary steps, but the steps are not necessarily performed in the order shown. Steps may be added, replaced, changed order, and/or eliminated as appropriate, in accordance with the spirit and scope of disclosed embodiments.

What is claimed is:
1. A circuit comprising:
a first circuit configured to operate at a first-circuit supply voltage value; and
to generate at least one of a first reference voltage value or a second reference voltage value, based on the first-circuit supply voltage value divided through a resistive device and based on a voltage rated for transistors in a second circuit; and the second circuit configured
to operate at the first-circuit supply voltage value;
to receive a first signal and at least one of the first reference voltage value or the second reference voltage value, wherein the first signal is configured to swing between a low voltage value and a high voltage value lower than the first-circuit supply voltage value; and
to keep a voltage across two terminals of a first transistor in the second circuit below the voltage rated for the first transistor, based on the at least one of the first reference voltage value or the second reference voltage value.

2. The circuit of claim 1, wherein
the first circuit is configured to generate at least one of a first voltage value or a second voltage value based on the first-circuit supply voltage value divided through the resistive device,
the first reference voltage value is generated based on the first voltage value, and
the second reference voltage value is generated based on the second voltage value.

3. The circuit of claim 1, wherein
the first circuit includes at least one of:
a first diode configured to be forward biased by a first current derived from the first-circuit supply voltage value and to generate a first voltage value, or
a second diode configured to be forward biased by a second current derived from the first-circuit supply voltage value and to generate a second voltage value,
the first reference voltage value is generated based on the first voltage value, and
the second reference voltage value is generated based on the second voltage value.

4. The circuit of claim 3, wherein
the resistive device has a first end configured to receive the first-circuit supply voltage value and a second end coupled to the first diode, or
the resistive device has a first end coupled to the second diode.

5. The circuit of claim 1, further comprising at least one of
an N-type source follower; or
a P-type source follower,
wherein
a gate of the N-type source follower is configured to receive a first voltage value based on the first-circuit supply voltage value,
a source of the N-type source follower is configured to provide the first reference voltage value,
a gate of the P-type source follower is configured to receive a second voltage value based on the first-circuit supply voltage value, and
a source of the P-type source follower is configured to provide the second reference voltage value.

6. The circuit of claim 5, further comprising at least one of
a first transistor in the first circuit; or
a second transistor in the first circuit,
wherein
the first transistor in the first circuit is coupled to the N-type source follower and configured as a current path for the N-type source follower, and
the second transistor in the first circuit is coupled to the P-type source follower and configured as a current path for the P-type source follower.

7. The circuit of claim 1, wherein
the second circuit comprises
a first P-type transistor having a first P-gate, a first P-drain, and a first P-source;
a second P-type transistor having a second P-gate, a second P-drain, and a second P-source;
a first N-type transistor having a first N-gate, a first N-drain, and a first N-source; and
a second N-type transistor having a second N-gate, a second N-drain, and a second N-source;
wherein the first P-source is configured to receive the first-circuit supply voltage value,
the first P-drain is coupled with the second P-source,
the second P-gate is configured to receive the second reference voltage value,
the second P-drain is coupled with the second N-drain,
the second N-gate is configured to receive the first reference voltage value,
the second N-source is coupled with the first N-drain,
the first N-gate is configured to receive the first signal, and
the first reference voltage value is clamped based on a voltage rated for the first P-type transistor, and the second reference voltage value is clamped based on a voltage rated for the first N-type transistor.

8. The circuit of claim 7, further comprising
a buffer circuit coupled to the first P-drain and a gate of a third P-type transistor.

9. The circuit of claim 1, wherein the second circuit is configured to provide an output voltage having a swing between the low voltage value and the first-circuit supply voltage value.

10. A method of protecting a first P-type transistor and a first N-type transistor, the method comprising:
generating a first reference voltage value based on a first-circuit supply voltage value and an N-type source follower;
generating a second reference voltage value based on the first-circuit supply voltage value and a P-type source follower;
applying the first reference voltage value to a gate of a second N-type transistor; and
applying the second reference voltage value to a gate of a second P-type transistor,
wherein
a source of the first P-type transistor is configured to receive the first-circuit supply voltage value,
a drain of the first P-type transistor is coupled with a source of the second P-type transistor,
a drain of the second P-type transistor is coupled with a drain of the second N-type transistor, and
a source of the second N-type transistor is coupled with a drain of the first N-type transistor.

11. The method of claim 10, wherein
the drain of the first P-type transistor is coupled with a buffer configured to buffer a signal at the drain of the first P-type transistor.

12. The method of claim 10, wherein
generating the first reference voltage value comprises the N-type source follower receiving a first voltage value generated from a first current through a first forward biased diode, and generating the second reference voltage value comprises the P-type source follower receiving a second voltage value generated from a second current through a second forward biased diode.

13. The method of claim 10, further comprising
receiving a first signal at a gate of the first N-type transistor, the first signal having a swing between a low voltage value and a high voltage value lower than the first-circuit supply voltage value, and
providing an output voltage, the output voltage having a swing between the low voltage value and the first-circuit supply voltage value.

14. A circuit comprising:
a reference voltage generating circuit comprising:
   a first source follower configured to generate a first reference voltage value based on a first-circuit supply voltage; and
   a second source follower configured to generate a second reference voltage value based on the first-circuit supply voltage; and
an output buffer comprising:
   a first transistor configured to receive the first reference voltage value;
   a second transistor configured to receive the second reference voltage value;
   a third transistor configured to receive an input signal having a swing between a low voltage value and a high voltage value lower than a value of the first-circuit supply voltage; and
   an output node between the first transistor and the second transistor,
   wherein the output buffer is configured to output an output voltage on the output node, the output voltage being based on the input signal and having a swing between the low voltage value and the first-circuit supply voltage value.

15. The circuit of claim 14, wherein
the reference voltage generating circuit is configured to generate a clamped voltage between a clamp circuit and a resistive device, and
one of the first source follower or the second source follower is configured to receive a value of the clamped voltage.

16. The circuit of claim 15, wherein the clamp circuit comprises a diode.

17. The circuit of claim 15, wherein the clamped voltage has a clamp value based on an offset from one of the low voltage value or the first-circuit supply voltage value.

18. The circuit of claim 17, wherein the offset has a value based on a safe operating region of a transistor in the output buffer.

19. The circuit of claim 14, wherein the output buffer further comprises:
   an inverter configured to receive the input signal and output an inverted version of the input signal; and
   a fourth transistor configured to receive the inverted version of the input signal.

20. The circuit of claim 14, wherein the output buffer further comprises:
   a fourth transistor coupled between the first transistor and a node carrying the first-circuit supply voltage; and
   an inverter configured to
     receive the first reference voltage value and the first-circuit supply voltage value, and
     control a gate of the fourth transistor based on the input signal.

* * * * *